United States Patent
Pantelidou et al.

(10) Patent No.: US 9,554,414 B2
(45) Date of Patent: Jan. 24, 2017

(54) METHOD AND APPARATUS FOR SCALING AN IDLE PERIOD OF TIME FOR WHICH AN ASSOCIATION IS MAINTAINED BETWEEN A STATION AND AN ACCESS POINT

(71) Applicant: Broadcom Corporation, Irvine, CA (US)

(72) Inventors: Anna Pantelidou, Oulu (FI); Timo Koskela, Oulu (FI); Samuli Turtinen, Ii (FI); Sami-Jukka Hakola, Kempele (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/384,299

(22) PCT Filed: Mar. 11, 2013

(86) PCT No.: PCT/IB2013/051921
§ 371 (c)(1),
(2) Date: Sep. 10, 2014

(87) PCT Pub. No.: WO2013/136255
PCT Pub. Date: Sep. 19, 2013

(65) Prior Publication Data
US 2015/0055641 A1 Feb. 26, 2015

Related U.S. Application Data

(60) Provisional application No. 61/609,606, filed on Mar. 12, 2012.

(30) Foreign Application Priority Data

Jul. 20, 2012 (GB) .................................. 1212912.8

(51) Int. Cl.
*H04W 4/00* (2009.01)
*H04W 76/04* (2009.01)
(Continued)

(52) U.S. Cl.
CPC ......... *H04W 76/04* (2013.01); *H04W 52/0216* (2013.01); *H04W 52/0219* (2013.01); *H04W 88/08* (2013.01)

(58) Field of Classification Search
CPC ... H04W 76/04; H04W 52/0216; H04W 88/08
See application file for complete search history.

(56) References Cited

U.S. PATENT DOCUMENTS 6,201,966 B1* 3/2001 Rinne ................... H04W 48/14
455/434
2002/0181426 A1* 12/2002 Sherman ........... H04W 74/0808
370/338
(Continued)

FOREIGN PATENT DOCUMENTS

WO WO2008097060 8/2008
WO WO2008136640 11/2008

OTHER PUBLICATIONS

Dezhi Zhang, et al.;IEEE 11-12/69r2; Consideration on Max Idle Period Extension for 802.11ah Power Save; Jan. 19, 2012; ZTE Corporation; 14 pages.

*Primary Examiner* — Abdelnabi O Musa
(74) *Attorney, Agent, or Firm* — Oblon, McClelland, Maier & Neustadt, L.L.P.

(57) ABSTRACT

A method, apparatus and computer program product are provided to allow the idle period to be defined in a more tailored manner, such as on a per station or per class of stations basis, as opposed to on a per access point basis. In the context of a method, an indication of an idle period is caused to be provided to a station. The method also causes an association with the station to be maintained for a period
(Continued)

of time that is at least partially defined by the idle period. The period of time for which an association is maintained with the station is different than a period of time for which an association is maintained with another station in an absence of communication with the another station. A corresponding apparatus and computer program product are also provided.

18 Claims, 7 Drawing Sheets

(51) Int. Cl.
*H04W 52/02* (2009.01)
*H04W 88/08* (2009.01)

(56) References Cited

U.S. PATENT DOCUMENTS

| | | | |
|---|---|---|---|
| 2004/0235536 A1* | 11/2004 | Kim | H04W 52/0216 |
| | | | 455/574 |
| 2007/0037548 A1* | 2/2007 | Sammour | H04W 52/0235 |
| | | | 455/343.2 |
| 2010/0246504 A1* | 9/2010 | Kim | H04W 72/1278 |
| | | | 370/329 |
| 2011/0164539 A1 | 7/2011 | Krishnaswamy et al. | |
| 2012/0147800 A1* | 6/2012 | Park | H04W 52/0261 |
| | | | 370/311 |

* cited by examiner

| Element ID | Length | Max Idle Period | Idle Options |
|---|---|---|---|

METHOD AND APPARATUS FOR SCALING AN IDLE PERIOD OF TIME FOR WHICH AN ASSOCIATION IS MAINTAINED BETWEEN A STATION AND AN ACCESS POINT

TECHNICAL FIELD

An example embodiment of the present invention relates generally to the association of a station with an access point and, more particularly, to the scaling of an idle period that at least partially defines the period of time for which an association is maintained between a station and an access point.

BACKGROUND

An access point may be configured to communicate with a variety of stations. These stations may include mobile terminals, such as cellular telephones, personal digital assistants (PDAs) or the like, as well as sensors that are configured to provide information regarding various sensed parameters. As association may be established between an access point and a station, such as the result of the exchange of a plurality of signals. As long as relatively frequent communication occurs between the access point and the station, the association between the access point and a station may be maintained and need not be reestablished, thereby avoiding the overhead associated with the exchange of signals required to establish the association. However, a station, such as a sensor, may sometimes communicate with the access point on a repeated, but an infrequent basis with substantial periods of silence there between.

A maximum idle period may be defined to indicate the maximum period of time for which an access point will maintain the association with a station in the absence of any communication therebetween. In order to conserve energy, the station may enter a sleep mode during periods in which the station does not communicate with the access point. Thus, a station may potentially sleep for a period of time equal in duration to the maximum idle period without being disassociated from the access point. The establishment of a maximum idle period therefore allows the station to save energy with idle periods having longer durations allowing longer periods of sleep without the requirement to disassociate from the access point, while also allowing resource management by the access point.

Figure 1:
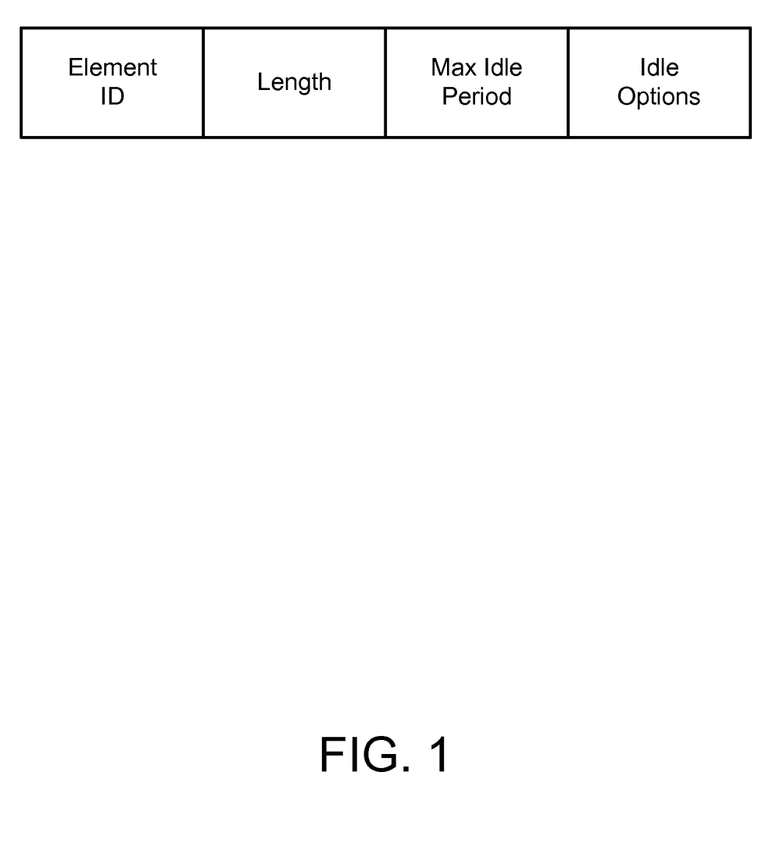
FIG. 1 is an illustration of a maximum idle period information element.

The access point may provide the stations with an information element that defines the maximum idle period. As shown in FIG. 1, one example of an information element that may be provided by the access point to the station in order to define the maximum idle period is illustrated. As shown, this information element may include an element identifier field, a length field, a maximum idle period field and an idle options field. In one example, the element identifier field, the length field and the idle option field are each one octet in length, while the maximum idle period field is two octets in length. As such, the maximum idle period of this example may be a sixteen bit unsigned integer. In an instance in which the value 0 of the maximum idle period field is reserved and the time period is specified in units of 1,000 time units (TUs), the maximum idle period can have a maximum length of $2^{16}-1=65,535$ seconds since a 1,000 TUs is approximately equal to one second. Stated differently, the maximum idle period may have a maximum length of approximately 1,092.25 minutes or 18.2 hours. In this example, a station that desires to remain associated with an access point beyond 18.2 hours would be required to transmit a message, such as a keep alive message, to the access point, thereby interrupting the sleep mode of the station and requiring otherwise unnecessary transmissions between the station and the access point. However, a failure to transmit a keep alive message or to otherwise communicate with the access point within the maximum period of 18.2 hours of this example would result in the access point and the station being disassociated, thereby requiring the overhead associated with the re-association messages that must be communicated between the access point and the station at a later time in order to reestablish the association.

In some instances, the maximum idle period as described in the foregoing example may not be sufficiently long. As such, it has been proposed in an article entitled "Consideration on Max Idle Period Extension for 802.11ah Power Save", doc IEEE 11-12/69r2 that the time period of the maximum idle period field be specified in units of about 10 seconds instead of units of about 1 second, thereby allowing a station to remain associated with an access point for about 182 hours or approximately 7.5 days. By simply increasing the size of the units in which the time period defined by the maximum idle period field is specified, the granularity of the maximum idle period becomes more coarse so as to limit the specificity with which a station may be disassociated from an access point. Additionally, this uniform increase in the length of the maximum idle period, while appropriate for some stations, may cause other stations to be associated with an access point for a longer period of time than is actually required, thereby unnecessarily consuming resources, such as the memory, of the access point. Further, even a maximum idle period of about 7.5 days may be insufficient in some instances depending upon the frequency with which a station communicates with an access point, such as the frequency with which a sensor reports data to an access point.

SUMMARY

A method, apparatus and computer program product are therefore provided according to an example embodiment in order to allow the idle period to be defined in a more tailored manner. As such, the method, apparatus and computer program product of one embodiment may permit the idle period to be defined on a per station or per class of stations basis, as opposed to on a per access point basis. Thus, the method, apparatus and computer program product of an example embodiment may more effectively balance the competing interests of having a longer idle period in order to avoid the otherwise unnecessary transmission of keep alive or other messages, with the desire in some instances to have shorter idle periods in order to provide more granularity in regards to the time at which an access point and a station are disassociated and to avoid periods of association that are unnecessarily long for some stations.

In one embodiment, a method is provided that includes causing an access point to provide an indication of an idle period to a station. The method of this embodiment also causes an association with the station to be maintained for a period of time at least partially defined by the idle period. The period of time for which an association is maintained with the station is different than a period of time for which an association is maintained with another station in an absence of communication with the another station.

In another embodiment, an apparatus is provided for use by an access point, the apparatus comprising a processing system, which may be embodied by at least one processor and at least one memory including computer program code.

The processing system is arranged to cause the apparatus to cause an indication of an idle period to be provided to a station. The processing system is also arranged to cause the apparatus of this embodiment to cause an association with the station to be maintained for a period of time at least partially defined by the idle period. The period of time for which an association is maintained with the station is different than a period of time for which an association is maintained with another station in an absence of communication with the another station.

In a further embodiment, a computer program product is provided comprising a set of instructions, which, when executed by an access point, causes the access point to cause an indication of an idle period to be provided to a station. The set of instructions, when executed by the access point, further cause an association with the station to be maintained for a period of time at least partially defined by the idle period. The period of time for which an association is maintained with the station is different than a period of time for which an association is maintained with another station in an absence of communication with the another station.

In one embodiment, a method is provided that includes a station receiving an indication of an idle period from an access point. The method of this embodiment also causes an association with the access point to be maintained by the station for a period of time at least partially defined by the idle period. The period of time for which the association is maintained with the access point is different than a period of time for which an association is maintained between the access point and another station in an absence of communication with the another station.

In another embodiment, an apparatus is provided for use by a station, the apparatus comprising a processing system, which may be embodied by at least one processor and at least one memory including computer program code. The processing system is arranged to cause the apparatus to receive an indication of an idle period from the access point. The processing system is arranged to cause the apparatus of this embodiment to cause an association with the access point to be maintained for a period of time at least partially defined by the idle period. The period of time for which the association is maintained with the access point is different than a period of time for which an association is maintained between the access point and another station in an absence of communication with the another station.

In a further embodiment, a computer program product is provided that comprises a set of instructions, which, when executed by a station, causes the station to receive an indication of an idle period from an access point. The set of instructions, when executed by the station, causes an association with the access point to be maintained for a period of time at least partially defined by the idle period. The period of time for which the association is maintained with the access point is different than a period of time for which an association is maintained between the access point and another station in an absence of communication with the another station.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

The method, apparatus and computer program product are provided in accordance with an example embodiment in order to maintain an association between an access point and a station for a time period that is at least partially based on a configurable idle period. Although the method, apparatus and computer program product may be implemented in a variety of different system architectures, one example of a system that may be specifically configured in order to implement an example embodiment of the present invention is shown in FIG. 2.

Figure 2:
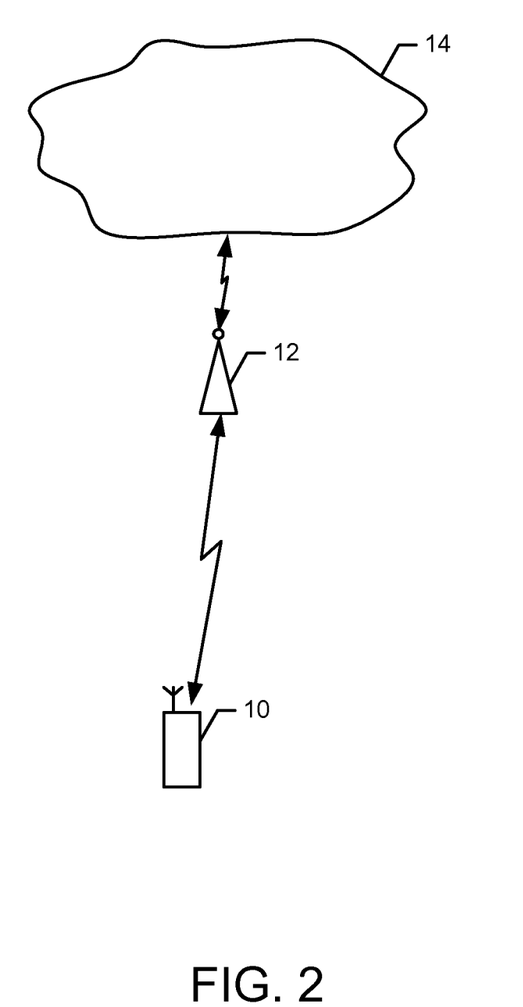
FIG. 2 is a block diagram of a system including an access point and a station that may be specifically configured in accordance with an example embodiment of the present invention.

Referring now to FIG. 2, a system that supports communications between a plurality of stations 10 (one of which is illustrated by way of example) and a network 14, such as an 802.11 network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network, via an access point 12 is shown. Various types of stations may be employed including mobile terminals that may include, for example, mobile communication devices such as, for example, mobile telephones, PDAs, pagers, laptop computers, tablet computers or any of numerous other hand held or portable communication devices, computation devices, content generation devices, content consumption devices, or combinations thereof. Another type of stations that may be employed includes sensors. The stations may have different communication patterns depending, for example, upon the type of station. For example, some mobile terminals may exchange messages with the access point on a regular basis once an association has been established therebetween, while some sensors may communicate with the access point on a much less frequent basis. Regardless of the type of station, the station may communicate with the network via an access point, such as a base station, a Node B, an evolved Node B (eNB), a relay node or other type of access point.

Figure 3:
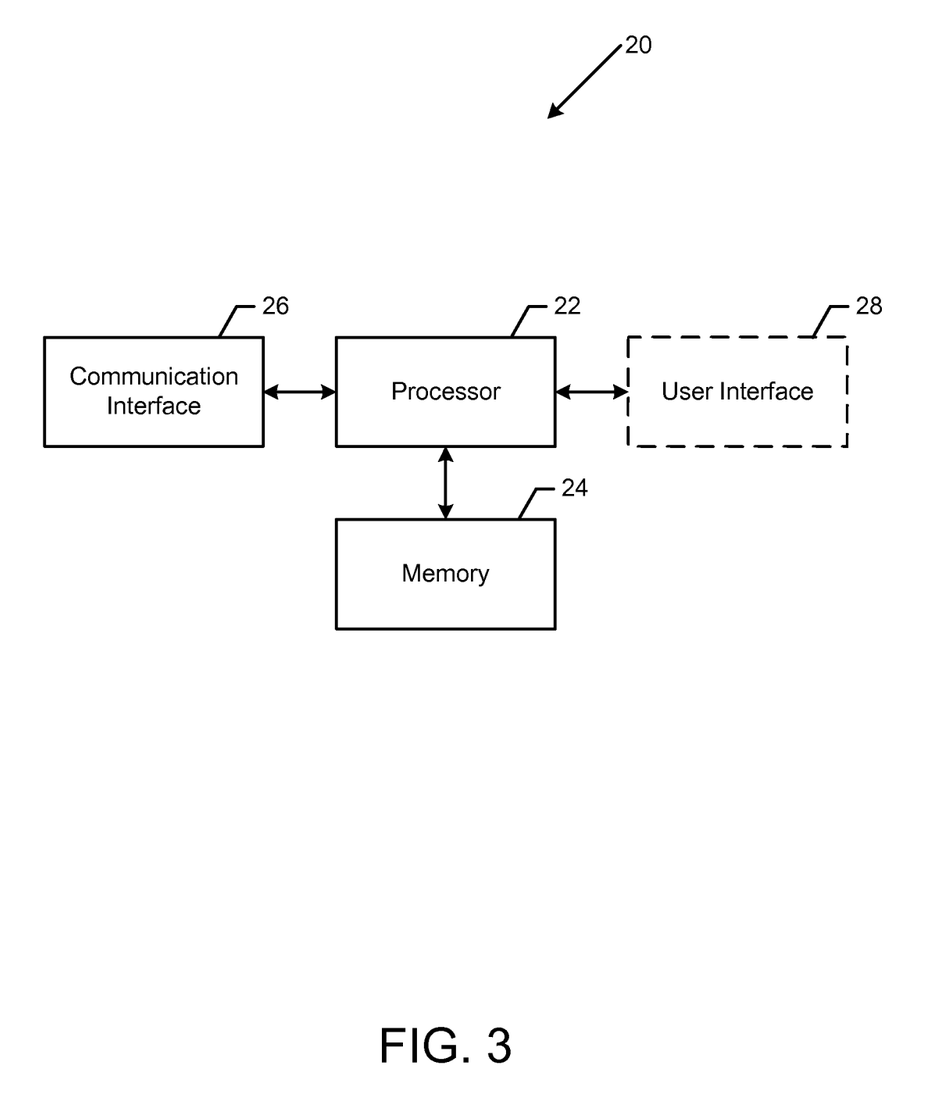
FIG. 3 is an apparatus that may be embodied as either an access point or a station and may be specifically configured in accordance with an example embodiment of the present invention.

The station 10 and the access point 12 may each embody or otherwise be associated with an apparatus 20 that is generally depicted in FIG. 3 and that may be configured to perform various operations in accordance with an example embodiment of the present invention as described below, such as in conjunction with FIG. 4 from the perspective of the access point and FIG. 10 from the perspective of the station. However, it should be noted that the components, devices or elements described below may not be mandatory and thus some may be omitted in certain embodiments. Additionally, some embodiments may include further or different components, devices or elements beyond those shown and described herein.

Figure 4:
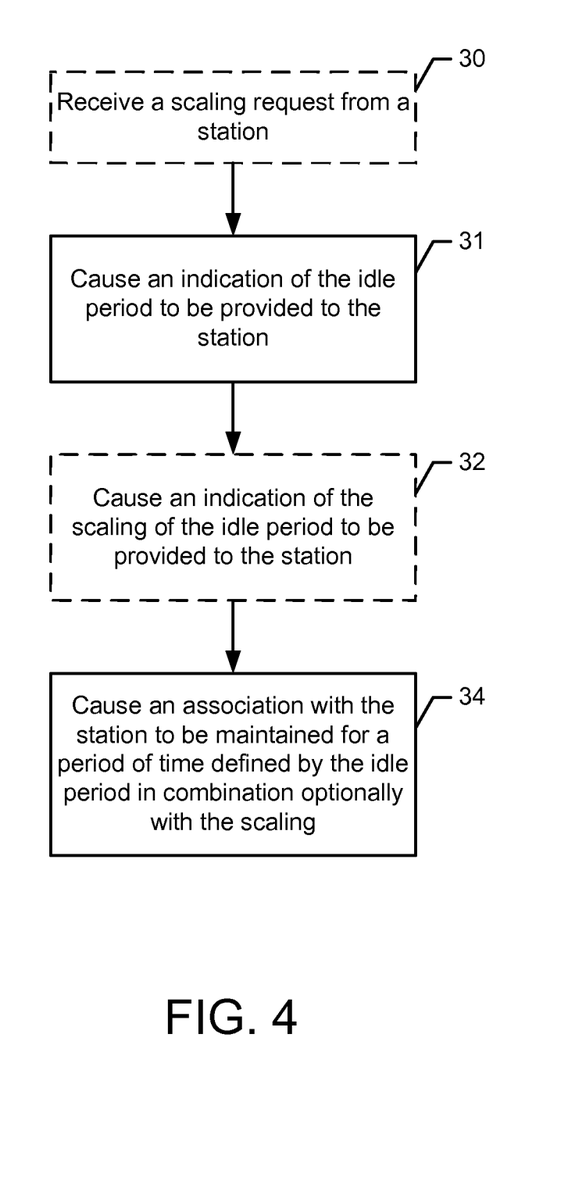
FIG. 4 is a block diagram illustrating the operations performed by an apparatus embodied by an access point in accordance with one example embodiment of the present invention.

As shown in FIG. 4, the apparatus 20 may include or otherwise be in communication with a processing system including, for example, processing circuitry that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and, in some cases in which the apparatus is embodied by the station 10, a user interface 28. As such, the processing circuitry may be embodied as a circuit chip (e.g., an integrated circuit chip) configured (e.g., with hardware, software or a combination of hardware and software) to perform operations described herein. However, in some embodiments taken in the context of the station or the access point 12, the processing circuitry may be embodied as a portion of base station or the access point.

The user interface 28 (if implemented in embodiments of the apparatus 20 embodied by the station 10) may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the station by receiving user input and providing output.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry, such as between the station 10 and the access point 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, FIGS. 4 and 10 are flowcharts illustrating the operations performed by a method, apparatus and computer program product, such as apparatus 20 of FIG. 2, from the perspective of the station 10 and the access point 12, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 4 and 10, when executed, convert a computer or processing circuitry into a particular machine configured to perform an example embodiment of the present invention. Accordingly, the operations of FIGS. 4 and 10 define an algorithm for configuring a computer or processing circuitry, e.g., processor, to perform an example embodiment. In some cases, a general purpose computer may be provided with an instance of the processor which performs the algorithm of FIGS. 4 and 10 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included as shown, for example by the dashed lines in FIGS. 4 and 10. It should be appreciated that each of the modifications, optional additions or amplifications below may be included with the operations above either alone or in combination with any others among the features described herein.

Referring now to FIG. 4, the operations performed by a method, apparatus and computer program product of an example embodiment are illustrated from the perspective of an apparatus 20 that may be embodied by or otherwise associated with the access point 12. In this regard, the apparatus may include means, such as the processing circuitry, the processor 22, the communication interface 26 or the like, for causing an indication of the idle period to be provided to the station 10. See block 31 of FIG. 4. In one embodiment, the access point may define the idle period on a per station or on a per class of station basis. Alternatively, the access point may define a single idle period for each of a plurality of stations, but may cause the association that is maintained between the stations and the access point to be modified based upon a scaling of the idle period that is defined, such as on a per station or a per class of stations basis. In this regard, the apparatus may also include means, such as the processing circuitry, the processor, the communication interface or the like, for causing an indication of the scaling of the idle period to be provided to the station 10. See block 32 of FIG. 4. As described below, the scaling for which an indication is provided may be one of a plurality of candidate scalings for the idle period.

Figure 5:
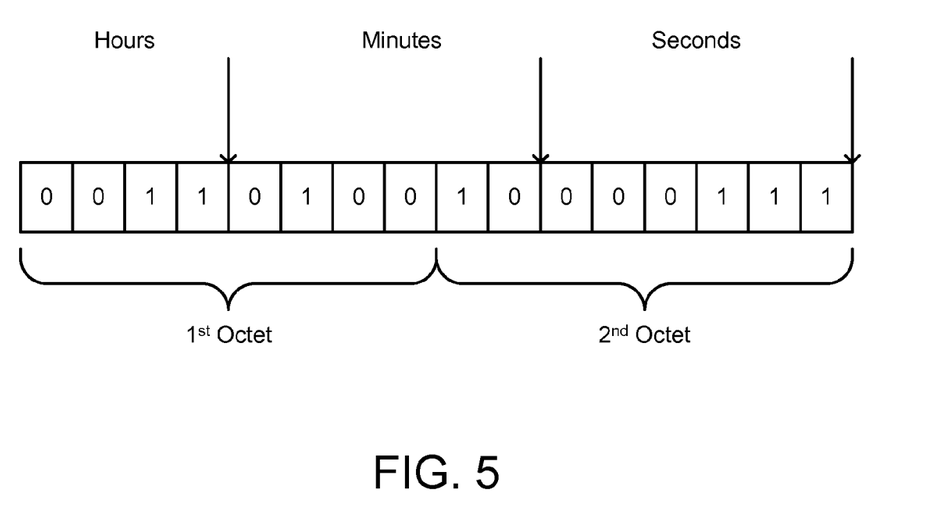
FIG. 5 is an illustration of the maximum idle period field in which the number of bits associated with the different units of time, e.g., hours, minutes and seconds, are configured in accordance within an example embodiment of the present invention.

A variety of different types of scaling may be employed by certain embodiments of the present invention. In one embodiment, the indication of the scaling of the idle period includes an indication of the number of bits of the idle period to be associated with each of a plurality of different units of time. By way of example, the indication of the scaling may define x bits of the maximum idle period field to be reserved for a designation of hours, y bits of the maximum idle period field to be reserved for a designation of minutes and z bits of the maximum idle period field to be reserved for a designation of seconds. By way of illustration, FIG. 5 depicts a maximum idle period in which four bits (x=4) are reserved for a designation of the hours, six bits (y=6) are reserved for the designation of minutes and six bits (z=6) are reserved for the designation of seconds. The relative number of bits reserved for each of the various units of time may differ depending upon the granularity with which the maximum idle period is to be defined and the maximum length of the maximum idle period that is desired. In this regard, the granularity may increase with increased numbers of bits being reserved for the designation of seconds. Additionally, the length of the maximum idle period may increase with increased numbers of bits being reserved for the designation of hours.

In addition to indicating the number of bits of the maximum idle period field that are reserved for each of the different units of time, the location of those bits within the maximum idle period field may also be defined by the indication of a scaling of the idle period that is provided to the station 10. With respect to the example of FIG. 5, the bits reserved for the designation of hours are the most significant bits, while the bits reserved for the designation of seconds are the least significant bits.

As noted above, the scaling of the idle period that is provided to the station 10 is one of a plurality of candidate scalings for the idle period. Continuing with the foregoing example, the plurality of candidate scalings of one embodiment may define different numbers of bits for the various units of time of the maximum idle period. In another embodiment, however, an access point 12 may communicate with two or more classes of stations 10. The class of station may be defined in various manners, but, in one embodiment, is defined based upon the anticipated communication requirements and behavior of the stations. For example, sensors that are anticipated to only infrequently report to the access point may be in one class, while mobile terminals that are anticipated to have much more frequent communications with the access point may be in another class. In this embodiment, the indication of the scaling of the idle period that is provided by the access point may be an indication of the scaling of the idle period that is to be utilized, not just by a specific station, but by a respective class of stations. Thus, the idle period may be differently scaled for the different classes of stations such that the candidate scalings include a respective scaling for each class of station.

In one embodiment, the indication of the idle period may be provided by broadcasting the scaling of the idle period for each of a plurality of different classes of stations 10. Each station of a respective class may therefore receive an indication of the scaling that is appropriate for a station of its class. By way of example, the scaling of the idle period may be such that the maximum idle period is substantially greater for the class of stations that includes sensors than the scaling of the maximum idle period for the class of stations that includes mobile terminals. In embodiments in which the number of classes is less and, typically, much less than the number of stations, the broadcasting of the scaling associated with each class of stations may be an efficient mechanism to communicate the scaling of the idle period to a plurality of stations.

Although an indication of the scaling of the idle period that defines the number of bits of the idle period to be associated with each of the plurality of different units of time is one example of scaling, other types of scaling may be utilized. For example, another type of scaling may cause the bits of the maximum idle period field to increase in value in a linear fashion from the least significant bit to the most significant bit, while yet another type of scaling may cause the bits of the maximum idle period field to increase in value in an exponential or other non-linear fashion from the least significant bit to the most significant bit. In this regard, a linear scaling may be provided by multiplying the idle period by a predefined value. In contrast, an exponential scaling may be provided by multiplying the idle period by a selected one of several predefined values that get progressively, e.g., exponentially, larger. For example, predefined values of 1, 10, 100 and 1000 may be predefined. The scaling may indicate which one of the predefined values is to be utilized such that the idle period is scaled by multiplying the idle period by the predefined value that is selected. In one optional embodiment, the apparatus 20 embodied by the access point 12 may include means, such as the processing circuitry, the processor 22, communication interface 26 or the like, for receiving a scaling request from a station 10 as shown in block 30 of FIG. 4. In response to the scaling request, the apparatus, such as the processor, the communication interface or the like, of this embodiment may cause the indication of the scaling of the idle period to be provided to the station. Various types of scaling requests may be provided by the station. For example, the scaling request may identify the class of the station. In response, the apparatus embodied by the access point, such as the processor, the communication interface or the like, may determine the scaling associated with the class of station identified by the scaling request and may, in turn, cause an indication of the scaling of the idle period that is associated with the identified class to be provided to the station.

Alternatively, the scaling request may include an indication of the scaling that is requested by the station 10. In response, the apparatus 20 embodied by the access point 12 may determine if the scaling requested by the station is appropriate or otherwise acceptable. For example, the apparatus embodied by the access point may determine the appropriateness of the requested scaling by determining if the scaling requested by the station exceeds any predefined limits upon the scaling of the idle period that may be provided or supported by the access point. The apparatus embodied by the access point, such as the processor 22, the communication interface 26 or the like, of this embodiment may also cause an indication of the scaling of the idle period to be provided that includes an indication of whether the scaling requested by the station is acceptable. In an instance in which the scaling requested by the station is considered unacceptable, such as by exceeding the predefined limits placed upon the scaling of the idle period that is supported by the access point, the apparatus embodied by the access point, such as the processor, the communication interface or the like, may either indicate to the station that the requested scaling is unacceptable such that the station may request another scaling or cause an indication to be provided to the station of a scaling of the idle period that is different than the scaling requested by the station, but is a scaling of the idle period that is supported by the access point.

Figure 6:
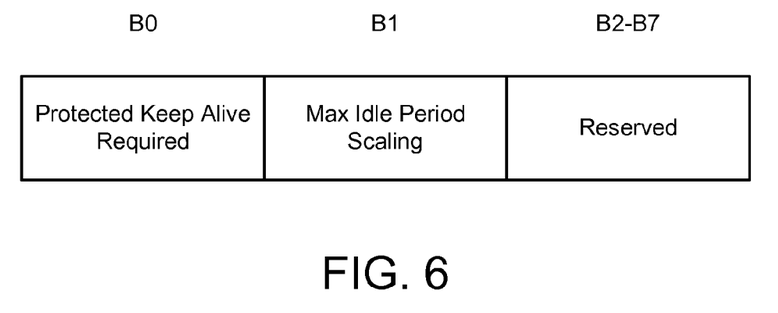
FIG. 6 illustrates one example of an idle options field of a maximum idle period information element in accordance with an example embodiment of the present invention.

The indication of the scaling of the idle period may be provided in various manners. In one embodiment, the idle options field of the maximum idle period information element may be utilized to convey the indication of the scaling of the idle period. As shown in FIG. 6, for example, the idle options field may be configured to have a field, such as a single bit, e.g., bit 0, indicating whether a protected keep alive message is required, a maximum idle period scaling field that provides the indication of the scaling of the idle period and a reserved field. In one embodiment, the maximum idle period scaling field may also be a single bit, such as bit 1 as shown in FIG. 6, and may simply indicate whether the idle period is to be scaled, such as in an instance in which the maximum idle period scaling field has a value of one, or is not to be scaled, such as in an instance in which the maximum idle period scaling field has a value of 0. In this embodiment, the scaling may be predefined and may be known in advance by both the access point 12 and the station 10 such that the indication of the scaling of the idle period is provided by the binary indication of whether the predefined scaling is to be applied or not.

Figure 7:
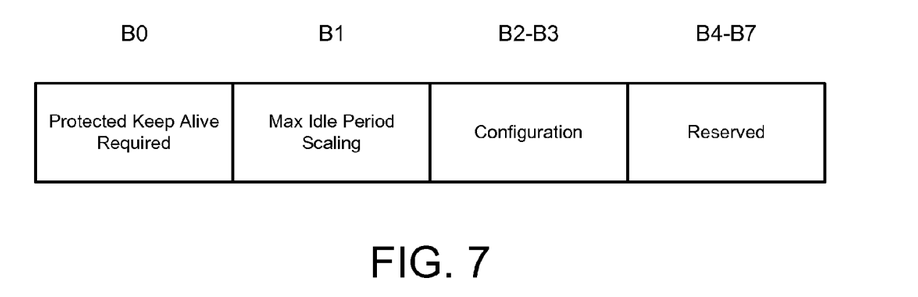
FIG. 7 illustrates another example of an idle options field of a maximum idle period information element in accordance with an example embodiment of the present invention.
Figure 8:
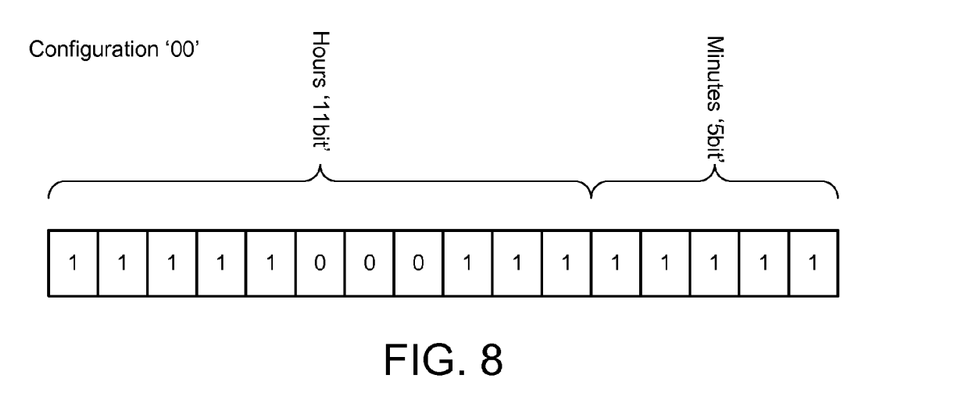
FIG. 8 illustrates one configuration of a maximum idle period field in accordance with an example embodiment of the present invention.
Figure 9:
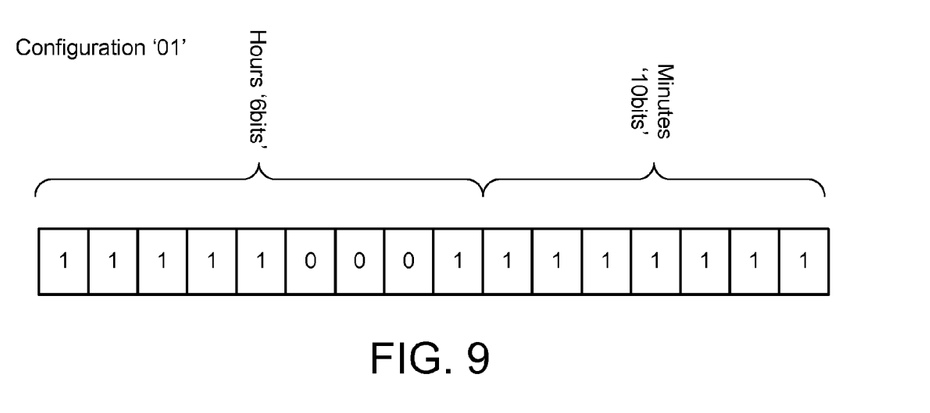
FIG. 9 illustrates another configuration of a maximum idle period field in accordance with an example embodiment of the present invention.

In another embodiment, the idle options field of the maximum idle period information element may again include a protected keep alive message required field, a maximum idle period scaling field and a reserved field, but may also include a configuration field, as shown in FIG. 7. The configuration field may be of any size, e.g., two bits, such as bits 2 and 3, in the illustrated example. In this embodiment, the maximum idle period scaling field again indicates whether scaling is to be performed or not. In an instance in which the maximum idle period scaling field indicates that the idle period is to be scaled, the configuration field may provide a value that defines the manner in which the idle period is to be scaled. In an instance in which the configuration field consists of two bits, the configuration field may define four distinct types of scaling. Although various types of scaling may be employed as described above, the configuration field of one example embodiment may provide for no scaling in an instance in which the configuration field has a value of 00, a fixed amount of scaling, such as a ten-fold multiplication of the maximum idle period in an instance in which the configuration field has a value of 01, a non-linear scaling, such as exponential scaling in which predefined values, such as progressively, e.g., exponentially, larger values are applied to the idle period, in an instance in which the configuration field has a value of 10. and division scaling, such as shown in FIG. 5 in which the bits of the maximum idle field are divided into those bits designated for different units of time, such as hours, minutes and seconds, in an instance in which the configuration field has value of 11. While the configuration field may define the type of scaling, both the details of each type of scaling, such as the magnitude of the fixed amount of scaling, the manner in which the non-linear scaling is to be applied and the number of bits designated for the different units of time in conjunction with the division scaling, may be predefined for each of the access point 12 and the station 10. In another embodiment, other types of predefined configurations may be predefined and may be indicated by a corresponding value of the configuration field. For example, a configuration field having a value of 00 and 01 may both relate to a division scaling in which different numbers of the bits of the maximum idle period are associated with different units of time. For example, one example of a division scaled representation of a maximum idle period in conjunction with a configuration field having a value of 00 is shown in FIG. 8 and another example of a division scaled representation of a maximum idle field associated with a configuration field having a value of 01 is shown in FIG. 9. As these two examples of FIGS. 8 and 9 illustrate, different numbers of the bits of the maximum idle period field may be designated for hours and for minutes depending upon the maximum length of the maximum idle period and the granularity of the maximum idle period that is desired.

Once the idle period and optionally the scaling has been coordinated between the access point 12 and the station 10, the apparatus 20 embodied by the access point may include means, such as the processing circuitry, the processor 22, the communication interface 26 or the like, for causing an association with the station to be maintained for a period of time at least partially defined by the idle period. See block 34 of FIG. 4. In this regard, in the absence of an exchange of messages or other communication between the station and the access point, the association between the access point and the station may be maintained for a period of time defined by the idle period. In an embodiment in which a scaling of the idle period is also provided, however, the association with the station is caused to be maintained for a period of time defined by a combination of the scaling and the idle period. In this regard, in the absence of an exchange of messages or other communication between the station and the access point, the association between the access point and the station may be maintained for a period of time defined by the scaled representation of the idle period. The period of time for which the association is maintained with the station is therefore configurable, such as by appropriately defining the idle time and/or the scaling, and, as such, may be different than the period of time for which an association is maintained with another station in an absence of communication with the another station. As such, the method, apparatus and computer program product of an example embodiment permit the scaling of the idle period to be tailored pursuant to the anticipated communications behavior of the station, or the class of the station, so as to efficiently balance the desire to maintain the association between the access point and the station as long as communications are expected, but to not make the maximum idle period excessively long in an instance in which communications are not expected.

Figure 10:
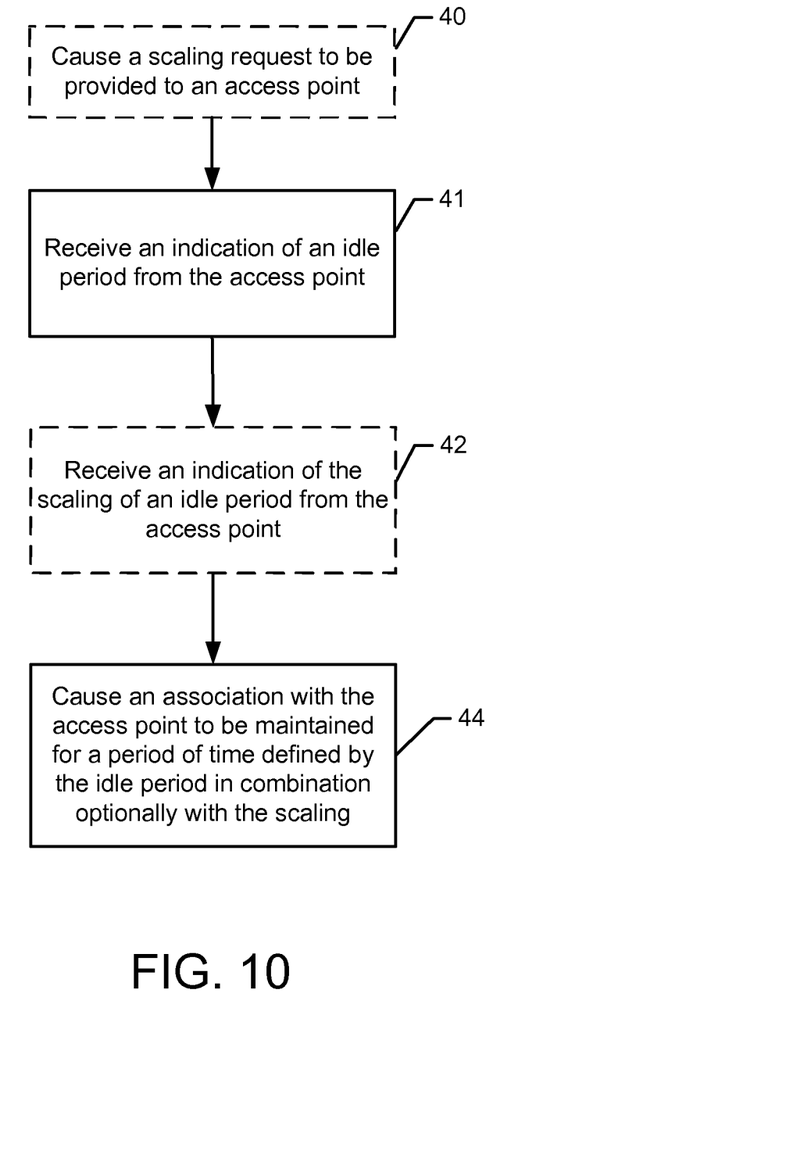
FIG. 10 is a block diagram illustrating the operations performed by an apparatus embodied by a station in accordance with an example embodiment of the present invention.

Referring now to FIG. 10, the operations performed by an apparatus 20 embodied by or otherwise included within a station 10 are illustrated. As shown in block 41 of FIG. 10, the apparatus embodied by the station may include means, such as the processing circuitry, the processor 22, the communication interface 26 or the like, for receiving an indication of the idle period from the access point 12. In one embodiment, the apparatus embodied by the station may also include means, such as the processing circuitry, the processor, the communication interface or the like, for receiving an indication of the scaling of the idle period from the access point. See block 42 of FIG. 10. As described above, various types of indications of the scaling of the idle period may be provided including, for example, an indication of the number of bits of the idle period to be associated with each of the plurality of different units of time. Although the indication of the scaling of the idle period may be provided by the access point in an unsolicited manner, the apparatus embodied by the station of one embodiment may include means, such as the processing circuitry, the processor, the communication interface or the like, for causing a scaling request to be provided to the access point with the subsequent indication of the scaling of the idle period being received from the access point in response to the scaling request. See block 40 of FIG. 10.

As described above, various types of scaling requests may be provided including a scaling request that provides an indication of the class of the station 10 such that the indication of the scaling of the idle period that is provided in response may be based upon the class of the station. Alternatively, the scaling request may include an indication of the scaling that is requested by the station. In this embodiment, the indication of the scaling of the idle period that is provided by the access point 12 may indicate whether the scaling that was requested is acceptable and, if not, may provide an indication of another scaling to the station.

As described above, once the idle period and optionally the scaling has been correlated between the access point 12 and the station 10, the apparatus 20 embodied by the station may include means, such as the processing circuitry, the processor 22, the communication interface 26 or the like, for causing an association with the access point to be maintained for a period of time at least partially defined by the idle period. In this regard, in the absence of an exchange of messages or other communication between the station and the access point, the association between the access point and the station may be maintained for a period of time defined by the idle period. In an embodiment in which a scaling of the idle period is also provided, however, the association with the station is caused to be maintained for a period of time defined by a combination of the scaling and the idle period. As noted above, the method, apparatus and computer program product of an example embodiment may therefore permit the idle period to be scaled in a manner that is tailored based upon the station or the class of station, such as based upon the anticipated communication behavior of the station.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for use by an access point, comprising:
    circuitry including a processor connected to a memory that includes program code that is executed by the processor and is configured to:
    receive from a station an idle period scaling request indicating a scaling to be used to set at least a granularity of the idle period;
    transmit an indication of the idle period based on the scaling to the station;
    set the idle period according to the scaling in the idle period scaling request; and
    cause the access point to maintain an association with the station for a period of time according to the idle period,
    wherein the scaling request includes an indication of a number of bits of the idle period to be associated with each of a plurality of different units of time.

2. The apparatus according to claim 1, wherein the period of time for which the association is maintained is defined on a per station basis.

3. The apparatus according to claim 1, wherein the period of time for which the association is maintained is defined on a per class of stations basis.

4. The apparatus according to claim 1, wherein the scaling comprises one of a plurality of possible scaling values for the idle period.

5. The apparatus according to claim 1, wherein the circuitry is further configured to adopt the scaling for a respective class of station.

6. The apparatus according to claim 5, wherein the circuitry is further configured to broadcast the scaling to members of the respective class of station.

7. The apparatus according to claim 1, wherein the circuitry is further configured to receive the scaling request by receiving an indication of a class of the station.

8. The apparatus according to claim 1, wherein the apparatus is included in the access point.

9. The apparatus according to claim 1, wherein the different units of time include hours, minutes and seconds.

10. A method for use by a station, the method comprising:
    transmitting, with circuitry, an idle period scaling request indicating a scaling to be used to set at least a granularity of the idle period;
    receiving, with the circuitry, an indication of an idle period from an access point, the idle period being scaled according to the scaling in the idle period scaling request;
    setting, with the circuitry, the idle period according to the scaling in the idle period scaling request; and
    maintaining, with the circuitry, an association with the access point for a period of time according to the idle period,
    wherein the scaling request includes an indication of a number of bits of the idle period to be associated with each of a plurality of different units of time.

11. The method according to claim 10, wherein the different units of time include hours, minutes and seconds.

12. An apparatus for use by a station, the apparatus comprising:
    circuitry including a processor connected to a memory that includes program code that is executed by the processor and configured to:
    transmit an idle period scaling request indicating a scaling to be used to set at least a granularity of the idle period
    receive an indication of an idle period from an access point, the idle period being scaled according to the scaling in the idle period scaling request;
    set the idle period according to the scaling in the scaling request; and
    maintain an association with the access point for a period of time according to the idle period,
    wherein the scaling request includes an indication of a number of bits of the idle period to be associated with each of a plurality of different units of time.

13. The apparatus according to claim 12, wherein the scaling comprises one of a plurality of possible scaling values for the idle period.

14. The apparatus according to claim 12, wherein the circuitry is further configured to receive an indication of the scaling of the idle period in response to the scaling request.

15. The apparatus according to claim 14, wherein the idle period scaling requests includes an indication of a class of the station, and to provide the indication of scaling of the idle period to all members of the class of the station.

16. The apparatus according to claim 14, wherein the circuitry is further configured to receive an indication of whether the scaling that was requested is acceptable to the access point.

17. The apparatus according to claim 12, wherein the apparatus is included in the station.

18. The apparatus according to claim 12, wherein the different units of time include hours, minutes and seconds.

* * * * *